United States Patent
De Falco et al.

[45] May 30, 1972

[54] SHIELDED OPTICAL RADIATION DETECTING DEVICE

[72] Inventors: Frank A. De Falco, Marlboro; Stephen N. Bobo, Cohasset, both of Mass.

[73] Assignee: Raytheon Company, Lexington, Mass.

[22] Filed: Sept. 28, 1970

[21] Appl. No.: 76,182

[52] U.S. Cl. ..................250/83.3 H, 250/227, 350/96 B
[51] Int. Cl. ..........................G01j 5/00, G02b 5/16
[58] Field of Search ............250/83.3 H, 227; 350/96, 96 B; 219/110, 125, 8.5

[56] References Cited
UNITED STATES PATENTS

| | | |
|---|---|---|
| 2,877,368 | 3/1959 | Sheldon ..........................250/227 X |
| 3,262,006 | 7/1966 | Sciaky..........................219/125 R X |
| 3,091,235 | 5/1963 | Richards ..........................350/96 B |

*Primary Examiner*—Archie R. Borchelt
*Attorney*—Harold A. Murphy

[57] ABSTRACT

An optical radiation detecting device adapted particularly for temperature detection systems such as welding apparatus and which comprises a fluid-cooled fiber-optic radiation sensing and transmitting means having means for shielding the sensing portion of the device from extraneous or stray radiation in the visible and near visible portions of the spectrum.

10 Claims, 4 Drawing Figures

Patented May 30, 1972 3,666,949
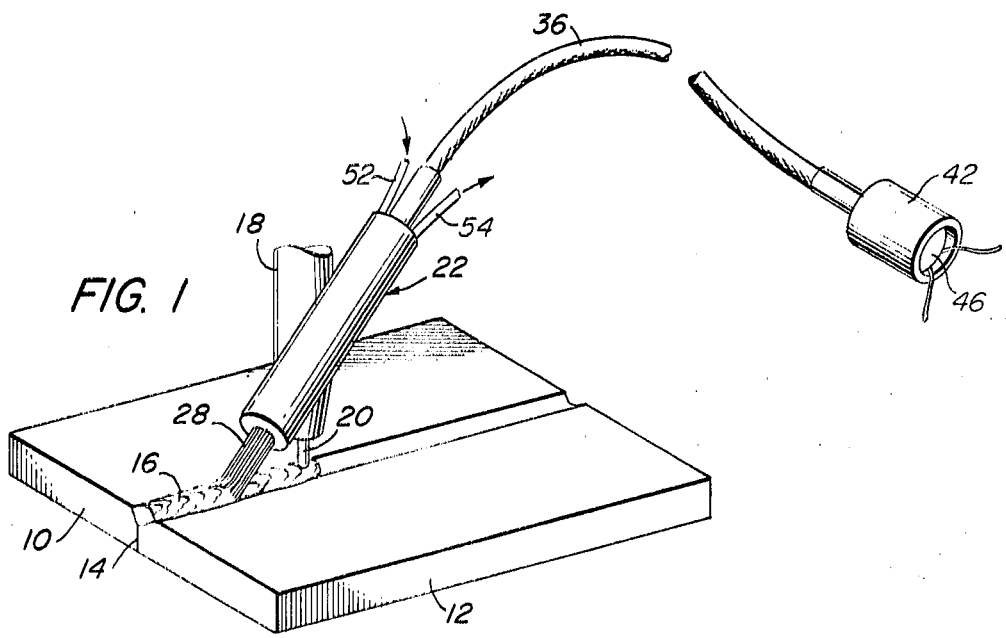
FIG. 1
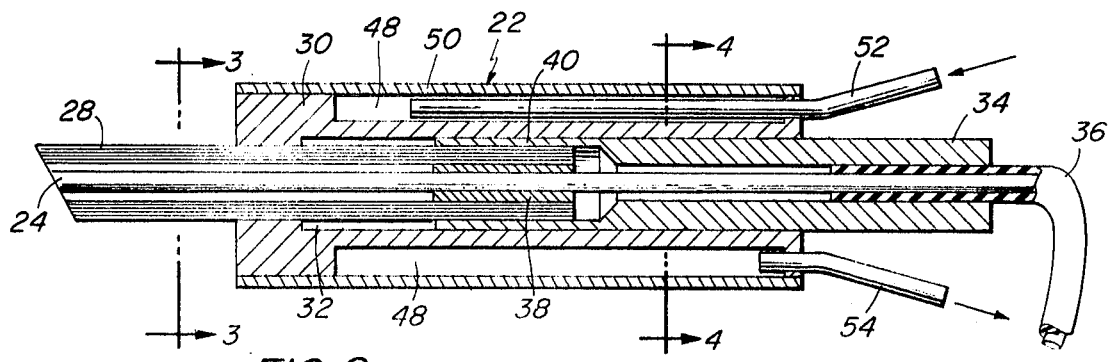
FIG. 2
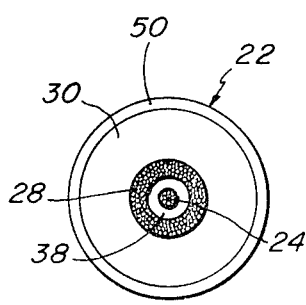
FIG. 3
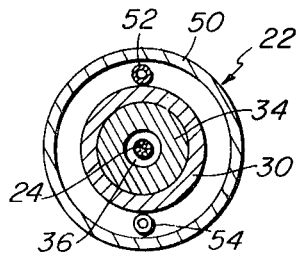
FIG. 4
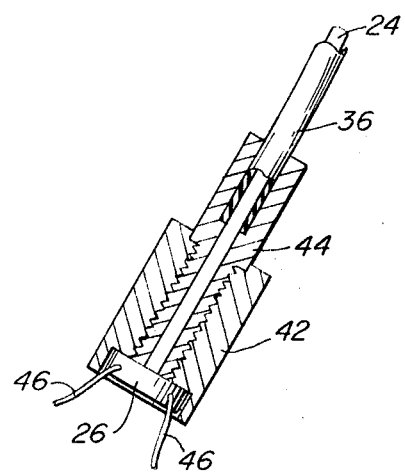

SHIELDED OPTICAL RADIATION DETECTING DEVICE

BACKGROUND OF THE INVENTION

The problem of obtaining temperature information in high temperature hostile environments has always been aggravated by the presence of high levels of ambient light and other optical radiation which tend to provide undesired contributions of energy to the detection system. For example, in arc welding apparatus a radiometer is often used to determine the temperature of fusion. The radiometer is directed onto the metal adjacent the arc weld. However, optical radiation from the arc invariably reflects or scatters into the optical path of the radiometer and is then transmitted to the radiation detector along with the electromagnetic energy from the weld, which energy is being detected and measured. In other cases, such as attempts to monitor the temperature of materials in ovens, for example, similar problems occur in that the ambient radiation in the oven enters the optical path to the detector.

Benefits are derived from the use of optical fibers as conduits of radiation from one point to another, particularly when they are in contact with the emitting surface and preferably also with the detector. One benefit was believed to be the availability of an unimpeded optical path between the target and the detector. It has been found, however, that skew light entering through the sides of the optical fibers contributes to the energy seen along the axis of the fiber element as a function of the scattering coefficient of the material of the optical fiber. Moreover, as the fiber in contact with the surface being measured moves with respect to the surface, it is quite possible to collect erroneous reflected information as well as scattered, both of which are undesirable.

SUMMARY OF THE INVENTION

The above and other disadvantages of conventional radiation detectors are improved upon or overcome by the present invention which extends the contact radiometry concept to use of unsupported glass or plastic optical fibers and to application of the modification of the principle of extramural attenuation in optical fibers. When the ends of unsupported glass fibers brush along a surface they sense the temperature of the surface by conveying radiance information through the lengths of the fibers to a detector. In accordance with this invention the radiation-conducting fibers are surrounded by a sheath of opaque fibers which function as attenuators to prevent unwanted stray light from entering the light-transparent fibers.

The opaque fibers, which may be a bundle of fibers of black glass, for example, are mounted in a suitable fixture in the manner of a hollow brush, with the hollow being occupied by the light-transparent fibers. As the brush contacts the surface being examined, the opaque fibers continue to surround the clear fibers and establish an annular sliding contact which is substantially impervious to external radiation by providing conforming contact with the surface being examined.

In further accordance with this invention the entire bundle of clear and opaque fibers is cooled by a novel system for circulation of a cooling fluid through the fiber-supporting fixture, thus preserving the integrity of the fiber tips.

BRIEF DESCRIPTION OF THE DRAWINGS

FIG. 1 is a diagrammatic illustration of the invention applied to a system for detecting infrared radiation from a weld;

FIG. 2 is an axial sectional view of the optical fiber brush and holder, and the radiation detector connected thereto; and FIGS. 3 and 4 are transverse sectional views taken respectively along the lines 3—3 and 4—4 of FIG. 2.

DESCRIPTION OF THE PREFERRED EMBODIMENT

Referring more particularly to the drawing, wherein like characters of reference designate like parts throughout the several views, a preferred embodiment of the invention is disclosed in FIG. 1 and is illustrated in position of use for detecting the temperature of a weld. It is to be understood, however, that the invention may be usefully applied to other systems and devices wherein optical radiation is to be sensed. By optical radiation is meant electromagnetic radiation within the visible, infrared or ultraviolet portions of the spectrum.

In the illustrative embodiment of FIG. 1, two parts 10 and 12 are being joined at interface 14 by a weld 16 by any normal or conventional welding technique. A welding electrode 18 is fragmentarily illustrated as having a welding tip 20 in engagement with the weld 16 the heat from which is to be detected by the device of the invention.

In accordance with this invention, there is provided a fixture 22 which contains longitudinally extending fiber optic bundle 24 (FIG. 2), one end of which extends outwardly from one end of the fixture into engagement or close proximity with the weld 16. The infrared radiation from the weld 16 passes into the fiber optic bundle 24 and travels along the bundle 24 to its opposite end where it is then transmitted to a suitable optical radiation detector 26 to be described.

The fixture 22 and end of the fiber bundle 24 move along the weld closely behind the electrode so as to detect the heat of the weld at a location reasonably close to the point at which the weld is being formed. Thus, the detector 26 will provide an output which is indicative of the heat at points along the weld, and thus weld quality can be relatively easily determined and controlled. However, it has been found that such temperature information has usually been false in nature because of the fact that ambient light and other undesired optical radiation has been permitted to enter the fiber optic element through the side walls thereof and tend to provide undesired contributions of optical energy to the detector. For example, in a system as disclosed in FIG. 1 it has been found that radiation from the arc produced by the welding tip 20 invariably reflects or scatters into the fiber optic element 24 and is then transmitted to the detector 26 along with the radiation from the weld. This obviously is undesirable.

Accordingly, in accordance with this invention the portion of the fiber optic bundle which protrudes outwardly from the fixture 22, and is therefore exposed, is enclosed within a sheath 28 of opaque fibers which maintain their surrounding relationship to the adjacent end portion of the bundle 24 during the welding and radiation-detecting cycle as shown in FIG. 1. Thus, ambient reflected and scattered optical radiation is prevented from entering the fiber optic bundle 24. The opaque fibers which constitute the sheath 28 are preferably formed of fine fibers of black glass which can be made in a well-known and conventional manner. However, other opaque materials may be used if desired, such as copper, tungsten or high temperature plastic.

The fixture 22 comprises an elongated metal body 30 which may be cylindrical in form and which is provided with an axial bore 32 (FIG. 2) which extends throughout its length. A sleeve 34 is mounted for sliding movement within the bore 32 and is adapted to support the fiber optic bundle 24 and opaque sheath 28 for the desired adjustment of the length of the protruding portions thereof. To achieve this, the fiber optic bundle 24 is mounted within a flexible cable 36 which is preferably a sheath or casing of rubber, plastic or other opaque material. The fiber optic bundle comprises in itself fine strands of light-transmitting material, glass or plastic, which are formed in a well-known conventional manner to a bundle or element having any desired cross-sectional size and shape. The fiber optic bundle or element 24 is held within the bore 32 of sleeve 34 by interfitting engagement between one end of the rubber casing 36 and adjacent end of the sleeve 34. The casing or sheath 36 which surrounds the major portion of the fiber optic bundle is terminated within the end portion of sleeve 34 so that the major portion of the bundle within the sleeve and fixture in uncovered. A ring or ferrule 38 is located around the bundle approximately midway of the fixture, and the inner end of the sheath 28 of opaque fibers is sealed as by an epoxy resin or the like between the ferrule 38 and the adjacent inner end portion 40 of the sleeve 34, which end portion 40 is thinned as shown so as to provide a suitable aperture in the sleeve for receiving the opaque sheath.

It will be apparent that upon longitudinal movement of sleeve 34 within the bore 32, the fiber bundle 24 and sheath 28 can be adjusted with respect to the fixture so as to control the length of the portions thereof which are permitted to extend beyond the end of the fixture. The extreme outer end surfaces of the fiber optic bundle and opaque sheath structure may be inclined to a desired angle as shown in FIG. 2 so as to enable the flexible fibers of the opaque sheath to move readily conform to the surface of the weld 16. However, the ends may be flat or may be made to other configurations, if desired.

In operation of the device, the sleeve 34 is adjusted as desired within fixture 30 to provide a projecting portion of fiber elements 24 and 28 of the desired length. A set screw or other means (not shown) may be used to retain the sleeve in adjusted position. Then the device is positioned as shown in FIG. 1 with the outer end of the fiber optic bundle 24 in engagement with or in close proximity to the weld 16 or other body being examined. The optical radiation being detected will pass from the body into the fiber optic bundle 24 which is transparent to this optical radiation and will be transmitted along the length of the bundle to a detector 26 which may be located at a remote point. The detector 26 may be any suitable device or material which is sensitive to the type of optical radiation being sensed such as, for example, lead sulphide, lead selenide, lead telluride, indium antimonide, cadmium mercury telluride, silicon or germanium. The detector is preferably formed as a disc which is located within a suitable holder 42 which may be mounted upon a stud 44 as by interconnecting threads or the like, the stud being fixed to the adjacent end of the casing 36 covering the bundle 24. The end of the fiber optic bundle 24 is preferably polished and located in close proximity to or in abutting relation with the adjacent surface of the detector 26. Leads 46 enable the detector to be interconnected with a suitable scope or other electrical device for the purpose of indicating or recording the radiation which is sensed by the detector, as is well known.

The extreme end of the fiber optic bundle 24 which is adapted to be adjacent the source of heat may be optically degraded by being made diffusing as by hammering, abrading or the like, or by being coated with a suitable heat-resistant material opaque to optical radiation, or by being melted and carbonized. When so optically degraded, the end of the bundle will be heated by the source being examined and will then become a reradiator and will thus transmit optical radiation from the degraded end which will be directly related to the temperature of the source being examined. The detector, however, will detect only the reradiation from the end of the bundle.

It will be apparent that in the operation of this device the heat generated within the fiber elements 24 and 28 as well as within the fixture 30 may be considerable. Therefore, in further accordance with this invention, means is provided for dissipation of such heat whereby the integrity of the ends of the fiber elements will be maintained. To provide such cooling, the outer surface of the body or cylinder 30 of the fixture is provided with a channel 48 which extends throughout the circumference and throughout the greater portion of the length of the cylinder. Cylinder 30 is mounted within a sheath or jacket 50 and is sealed thereto to enclose the channel 48. One end of a tube or conduit 52 extends into the channel 48 for a considerable length from the end of the cylinder 30 which is directed toward the detector, and provides an inlet for a suitable fluid coolant. At a point spaced from the conduit 52 there is provided a second conduit 54 which extends through the adjacent end of body 30 and into the channel 48 for providing exit of the cooling fluid. Conduits 52 and 54 may be suitably connected to a coolant supply system whereby coolant such as a suitable gas, water or oil may be made to flow through the channel 48 for the purpose of dissipating heat which is accumulated by the fixture.

It will be apparent from the foregoing that the objectives of this invention have been achieved by the structure shown and described which enables optical radiation in a body to be detected without interference by undesirable stray, reflected or scattered optical radiation. Therefore, a more accurate detection of the desired radiation is achieved. It is to be understood, however, that various modifications and changes may be made in the structure shown and described by those skilled in the art without departing from the spirit of the invention as expressed in the accompanying claims. Therefore, it is to be understood that all matter shown and described is to be interpreted as illustrative and not in a limiting sense.

We claim:

1. A device for detecting optical radiation from a source comprising a radiation-transparent bundle of optical fibers having a first end adapted to be disposed adjacent said source to receive optical radiation therefrom, a radiation detector at the opposite end of the bundle for detection of radiation which passes through the bundle from said first end, and means surrounding said first end and adjacent portion of the bundle and adapted to surround said source for intercepting all optical radiation except that which emanates from said source and thereby preventing stray optical radiation from entering the bundle.

2. A device as set forth in claim 1 wherein said means is a bundle of opaque fibers.

3. A device as set forth in claim 2 wherein said opaque fibers are flexible so as to conform with the surface of the source when in engagement therewith.

4. A device for detecting optical radiation from a source comprising an elongated fixture having a longitudinally extending opening, an optical radiation-transparent bundle of optical fibers within said opening and having a first end projecting outwardly from one end of the fixture and adapted to be disposed in proximity to said source for receiving optical radiation therefrom, an optical radiation detector adjacent the opposite end of the bundle, and a sheath of opaque fibers mounted in said fixture and surrounding said projecting portion of the bundle and adapted to surround said source for intercepting all optical radiation except that which emanates from said source and for preventing stray optical radiation from entering the bundle.

5. A device as set forth in claim 4 wherein a sleeve is positioned in the opening in the fixture, and the fiber bundle and sheath of opaque fibers are carried by the sleeve for movement therewith to adjust the extent to which the fibers and sheath extend beyond the end of the fixture.

6. A device as set forth in claim 4 wherein the opaque fibers in said sheath are flexible.

7. A device as set forth in claim 5 wherein said sleeve is slidably mounted in said fixture, the fixture is provided with an internal cavity which encircles said sleeve, and inlet and outlet means is provided through the fixture into the cavity to permit flow of coolant through the cavity.

8. A weld temperature detection device comprising an elongated fixture having a longitudinally extending opening, an infrared-transparent bundle of optical fibers within said opening and having a first end portion projecting outwardly from one end of the fixture for position adjacent a weld for collecting infrared radiation from the weld, the fiber bundle extending from the opposite end of the fixture and having a second end remote from the fixture, a sheath of opaque fibers mounted in said fixture in surrounding relation to the portion of the bundle which projects from the fixture and adapted to surround the weld for intercepting all infrared radiation except that which emanates from the weld, a second fixture carrying said second end of the bundle, and an infrared detector in said second fixture positioned to receive infrared radiation from the adjacent end of the bundle.

9. A device as set forth in claim 8 wherein said opaque fibers are flexible so as to conform to the shape of the weld when in engagement therewith.

10. A device as set forth in claim 9 wherein said end of the bundle is optically degraded and is a reradiator of infrared radiation when in position of use adjacent a radiating weld body.

* * * * *